United States Patent
Zhang et al.

(10) Patent No.: US 11,704,558 B2
(45) Date of Patent: Jul. 18, 2023

(54) METHOD OF AND SYSTEM FOR TRAINING MACHINE LEARNING ALGORITHM FOR OBJECT CLASSIFICATION

(71) Applicant: Element AI Inc., Montreal (CA)

(72) Inventors: Xiang Zhang, Montreal (CA); Alexandre Drouin, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 466 days.

(21) Appl. No.: 16/880,191

(22) Filed: May 21, 2020

(65) Prior Publication Data

US 2021/0365772 A1 Nov. 25, 2021

(51) Int. Cl.
*G06N 3/08* (2023.01)
*G06N 3/04* (2023.01)

(52) U.S. Cl.
CPC .......... *G06N 3/08* (2013.01); *G06N 3/04* (2013.01)

(58) Field of Classification Search
CPC .......... G06N 3/08; G06N 3/04; G06N 3/0454; G06N 20/00; G06N 3/02; G06F 16/55; G06F 16/285; G06V 10/764; G06V 10/82; G06K 9/6267; G06K 9/6293; G06T 2207/20081
USPC ............ 706/20, 31, 16, 15, 12, 25; 382/181, 382/224, 227; 707/779
See application file for complete search history.

(56) References Cited

U.S. PATENT DOCUMENTS

| | | | | |
|---|---|---|---|---|
| 10,581,888 B1 * | 3/2020 | Agranonik | .......... | H04L 63/1425 |
| 11,399,035 B1 * | 7/2022 | Batchu | ................ | H04L 63/0227 |
| 2017/0308613 A1 | 10/2017 | Zhu et al. | | |
| 2018/0121787 A1 | 5/2018 | Hashimoto et al. | | |
| 2019/0179796 A1 | 6/2019 | Lakhman et al. | | |
| 2019/0188263 A1 | 6/2019 | Ock et al. | | |
| 2019/0236135 A1 * | 8/2019 | Tyamagondlu Nagabhushan | ....... | G06N 3/08 |
| 2019/0258713 A1 | 8/2019 | Kiros et al. | | |

(Continued)

OTHER PUBLICATIONS

Thomas, Andy "Word2Vec Word embedding tutorial in Python and TensorFlow" Adventures in Machine Learning, pp. 1-24, Jul. 21, 2017, retrieved from https://adventuresinmachinelearning.com/word2vec-tutorial-tensorflow on Aug. 14, 2021.

(Continued)

*Primary Examiner* — Evan Aspinwall
(74) *Attorney, Agent, or Firm* — Fasken Martineau Dumoulin LLP; Serge LaPointe

(57) ABSTRACT

A method and a system for training a machine learning algorithm (MLA) for object classification. The machine learning algorithm includes an embedding layer and a classification layer. A set of embedding indices representing a reference object is received. The set of embedding indices has been generated based on a byte representation of the reference object. A label associated with the reference object indicative of a reference class the objects belongs to is received. The MLA is iteratively trained to classify objects by embedding the set of embedding indices to obtain an input vector and by predicting an estimated class based on the input vector, and updating a parameter of at least one of the embedding layer and the updated embedding layer. The set of embedding indices is generated by parsing the byte representation to obtain byte n-grams and by applying a hash function on the byte n-grams.

20 Claims, 6 Drawing Sheets

(56) References Cited

U.S. PATENT DOCUMENTS

2019/0273510 A1* 9/2019 Elkind .................. G06N 20/00
2019/0287685 A1* 9/2019 Wu ........................ G06F 40/30
2020/0134466 A1   4/2020 Weintraub et al.

OTHER PUBLICATIONS

Minaee, S. et al. "Deep Learning Based Text Classification: A Comprehensive Review", arXiv.org, v1, pp. 1-42, Apr. 6, 2020, retrieved from https://arxiv.org/abs/2004.03705v1 on Aug. 14, 2021 (whole document in particular Abstract, Introduction, Sections 1-2, Appendix 1-6).
Joulin, Armand et al., Bag of Tricks for Efficient Text Classification, Aug. 9, 2016, arXiv preprint arXiv:1607.01759.
Wang, Changhan et al., Neural Machine Translation with Byte-Level Subwords, Dec. 5, 2019 arXiv preprint arXiv:1909.03341.
Joulin et al., "FastTExt.zip: Compressing text classification models", arXiv.org, v1, pp. 1-13, https://arxiv.org/abs/1612.03651, Dec. 12, 2016 (Dec. 12, 2016).

* cited by examiner

METHOD OF AND SYSTEM FOR TRAINING MACHINE LEARNING ALGORITHM FOR OBJECT CLASSIFICATION

CROSS-REFERENCE TO RELATED APPLICATIONS

None.

FIELD

The present technology relates to machine learning algorithms (MLAs) in general and more specifically to a method of and a system for training a MLA for object classification.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

One or more embodiments of the present technology have been developed based on developers' appreciation that in the context of natural language processing (NLP) linear embedding and classification models have been proven, in some instances, to work as well as deep learning models while being simpler and less costly to implement, not only in terms of processing power and training time, but also financially speaking.

Developers' have also appreciated that processing text at the level of sequences of words or n-grams and characters has proven to be efficient for a wide variety of applications. Such developments were made based on the assumption that language, at the most basic level of abstraction, starts at the level of words.

However, developers have appreciated that generally speaking, computers represent information in bytes, which can take 256 different values. Thus, developers have envisioned that embedding and classification models could be used by processing byte representations. Thus, text, or any type of could be represented in the form of bytes, and provided to embedding and classification models.

Such byte representations may be processed into fixed size representations before being provided as an input to an embedding model, and a classification model. Further, developers have also theorized that byte sequences could be compressed to further reduce their size and increase the performance of the machine learning models.

Thus, one or more embodiments of the present technology are directed to method of and system for training machine learning algorithm for object classification.

In accordance with a broad aspect of the present technology, there is disclosed a method for training a machine learning algorithm (MLA) for object classification, the method is executed by a processor, and the processor has access to the MLA. The method includes: receiving a set of indices being associated with a reference object belonging to a reference class. receiving a label indicative of the reference class associated with the reference object. training the MLA for object classification, said training includes: embedding, using an embedding layer of the MLA, the set of indices to obtain an input vector representing the reference object. The method includes: predicting, using a classification layer of the MLA, an estimated class for the reference object based on the input vector, and updating, based on the estimated class and the reference class, at least one of: the classification layer to obtain an updated classification layer, and the embedding layer to obtain an updated embedding layer. The method includes: outputting the trained MLA.

In one or more embodiments of the method, the method further includes, prior to said receiving the set of indices: receiving a byte sequence representing the reference object associated with the set of indices, and generating, based on the byte sequence, the set of indices.

In one or more embodiments of the method, said generating the set of indices includes: parsing the byte sequence to obtain a set of byte chunks, and applying a hash function on the set of byte chunks to obtain the set of indices.

In one or more embodiments of the method, said parsing the byte sequence to obtain the set of byte chunks includes iterating, based on a predetermined length, over the byte sequence to obtain the set of byte chunks.

In one or more embodiments of the method, the method further includes, prior to said parsing the byte sequence to obtain the set of byte chunks: compressing the byte sequence to obtain a compressed byte sequence, and said parsing the byte sequence to obtain the set of byte chunks includes parsing the compressed byte sequence to obtain the set of byte chunks.

In one or more embodiments of the method, the set of indices includes a first subset of indices and a second subset of indices, and said embedding, using the embedding layer of the MLA, the set of indices to obtain the input vector representing the reference object includes: embedding the first subset of indices to obtain a first vector and embedding the second subset of indices to obtain a second vector, and combining the first vector and the second vector to obtain the input vector.

In one or more embodiments of the method, said receiving the subset of indices includes the first subset of indices and the second subset of indices includes: receiving a first set of weights associated with the first subset of indices, and receiving a second set of weights associated with the second subset of indices, and said combining the first vector and the second vector to obtain the input vector includes: weighting the first vector by the first set of weights to obtain a first weighted vector, weighting the second vector by the second set of weights to obtain a second weighted vector, and combining the first weighted vector and the second weighted vector to obtain the input vector.

In one or more embodiments of the method, the hash function is a non-cryptographic hash function.

In one or more embodiments of the method, the non-cryptographic hash function is one of a Fowler-Noll-Vo (FNV) hash function, and a CityHash function.

In one or more embodiments of the method, the classification layer is a linear classification layer.

In one or more embodiments of the method, the method further includes, prior to said training the MLA for object classification: initializing the embedding layer and the classification layer of the MLA by sampling a distribution.

In one or more embodiments of the method, the embedding layer executes an embedding matrix, the classification layer executes a classification matrix, and said updating, based on the estimated class and the reference class, the at least one of the classification layer to obtain the updated classification layer and the embedding layer to obtain the updated embedding layer includes: updating at least one parameter of the embedding matrix to obtain an updated embedding matrix, and updating at least one parameter of the classification matrix to obtain an updated classification matrix, respectively.

In one or more embodiments of the method, said training the MLA for object classification is performed using stochastic gradient descent and back-propagation.

In one or more embodiments of the method, said training the MLA for object classification includes using at least one of: a negative log-likelihood function, and a hinge loss function.

In one or more embodiments of the method, said training the MLA for object classification includes performing universum sampling.

In accordance with a broad aspect of the present technology, there is disclosed a method for predicting an estimated class for a further object using the trained MLA. The method includes: receiving a further byte sequence representing the further object, the trained MLA not having been trained on the further object, generating, based on the further byte sequence, a further set of indices associated with the further object. The method includes embedding, using the updated embedding layer of the trained MLA, the further set of indices to obtain a further input vector. The method includes predicting, using the updated classification layer of the trained MLA, based on the further input vector, the estimated class for the further object.

In one or more embodiments of the method, the reference object includes one of: at least a portion of a genome, at least one character, and at least a portion of an image.

In one or more embodiments of the method, the method further includes, prior to said outputting the trained MLA: receiving a plurality of sets of indices, each one of the plurality of sets of indices being associated with a respective reference object belonging to a respective reference class, receiving, for each respective reference object, a respective label indicative of the respective reference class associated with the respective reference object. The method includes training the MLA iteratively on each one of the plurality of sets of indices and the respective label.

In accordance with a broad aspect of the present technology, there is provided a method for predicting an estimated class of an object, the method being executed by a processor, the processor having access to a machine learning algorithm (MLA). The MLA has been trained to classify objects, the MLA has an embedding layer and a classification layer. The method includes receiving a byte representation of the object, and generating, based on the byte representation, a set of embedding indices associated with the object. The method includes embedding, using the embedding layer of the MLA, the set of embedding indices to obtain an input vector representing the object. The method includes predicting, using a classification layer of the MLA, the estimated class for the object based on the input vector, and outputting the estimated class.

In accordance with another broad aspect of the present technology, there is provided a system for training a machine learning algorithm (MLA) for object classification. The system includes a processor, and a non-transitory storage medium operatively connected to the processor. The non-transitory storage medium includes computer readable instructions, the processor has access to the MLA, the processor, upon executing the computer readable instructions, is configured for: receiving a set of indices being associated with a reference object belonging to a reference class, and receiving a label indicative of the reference class associated with the reference object. The processor is configured for training the MLA for object classification, said training including: embedding, using an embedding layer of the MLA, the set of indices to obtain an input vector representing the reference object, predicting, using a classification layer of the MLA, an estimated class for the reference object based on the input vector, updating, based on the estimated class and the reference class, at least one of: the classification layer to obtain an updated classification layer, and the embedding layer to obtain an updated embedding layer. The processor is configured for outputting the trained MLA.

In one or more embodiments of the system, the processor is further configured for, prior to said receiving the set of indices: receiving a byte sequence representing the reference object associated with the set of indices, and generating, based on the byte sequence, the set of indices.

In one or more embodiments of the system, said generating the set of indices includes: parsing the byte sequence to obtain a set of byte chunks, and applying a hash function on the set of byte chunks to obtain the set of indices.

In one or more embodiments of the system, said parsing the byte sequence to obtain the set of byte chunks includes iterating, based on a predetermined length, over the byte sequence to obtain the set of byte chunks.

In one or more embodiments of the system, the processor is further configured for, prior to said parsing the byte sequence to obtain the set of byte chunks: compressing the byte sequence to obtain a compressed byte sequence, and said parsing the byte sequence to obtain the set of byte chunks includes parsing the compressed byte sequence to obtain the set of byte chunks.

In one or more embodiments of the system, the set of indices includes a first subset of indices and a second subset of indices, and said embedding, using the embedding layer of the MLA, the set of indices to obtain the input vector representing the reference object includes: embedding the first subset of indices to obtain a first vector and embedding the second subset of indices to obtain a second vector, and combining the first vector and the second vector to obtain the input vector.

In one or more embodiments of the system, said receiving the subset of indices including the first subset of indices and the second subset of indices includes: receiving a first set of weights associated with the first subset of indices, and receiving a second set of weights associated with the second subset of indices, and said combining the first vector and the second vector to obtain the input vector includes: weighting the first vector by the first set of weights to obtain a first weighted vector, weighting the second vector by the second set of weights to obtain a second weighted vector, and combining the first weighted vector and the second weighted vector to obtain the input vector.

In one or more embodiments of the system, the hash function is a non-cryptographic hash function.

In one or more embodiments of the system, the non-cryptographic hash function is one of a Fowler-Noll-Vo (FNV) hash function, and a CityHash function.

In one or more embodiments of the system, the classification layer is a linear classification layer.

In one or more embodiments of the system, the processor is further configured for, prior to said training the MLA for object classification: initializing the embedding layer and the classification layer of the MLA by sampling a distribution.

In one or more embodiments of the system, the embedding layer executes an embedding matrix, the classification layer executes a classification matrix, and said updating, based on the estimated class and the reference class, the at least one of the classification layer to obtain the updated classification layer and the embedding layer to obtain the updated embedding layer includes: updating at least one parameter of the embedding matrix to obtain an updated embedding matrix, and updating at least one parameter of the classification matrix to obtain an updated classification matrix, respectively.

In one or more embodiments of the system, said training the MLA for object classification is performed using stochastic gradient descent and back-propagation.

In one or more embodiments of the system, said training the MLA for object classification includes using at least one of: a negative log-likelihood function, and a hinge loss function.

In one or more embodiments of the system, said training the MLA for object classification includes performing universum sampling.

In accordance with a broad aspect of the present technology, there is provided a system for predicting an estimated class for a further object using the trained MLA. The processor is configured for receiving a further byte sequence representing the further object, the trained MLA not having been trained on the further object, and generating, based on the further byte sequence, a further set of indices associated with the further object. The processor is configured for embedding, using the updated embedding layer of the trained MLA, the further set of indices to obtain a further input vector, and predicting, using the updated classification layer of the trained MLA, based on the further input vector, the estimated class for the further object.

In one or more embodiments of the system, the reference object includes one of: at least a portion of a genome, at least one character, and at least a portion of an image.

In one or more embodiments of the system, the processor is further configured for, prior to said outputting the trained MLA: receiving a plurality of sets of indices, each one of the plurality of sets of indices being associated with a respective reference object belonging to a respective reference class, and receiving, for each respective reference object, a respective label indicative of the respective reference class associated with the respective reference object, and training the MLA iteratively on each one of the plurality of sets of indices and the respective label.

Definitions

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art will appreciate, the degree of precision required in such an indication depends on the extent of any prior understanding about the interpretation to be given to information being exchanged as between the sender and the recipient of the indication. For example, if it will be appreciated that prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
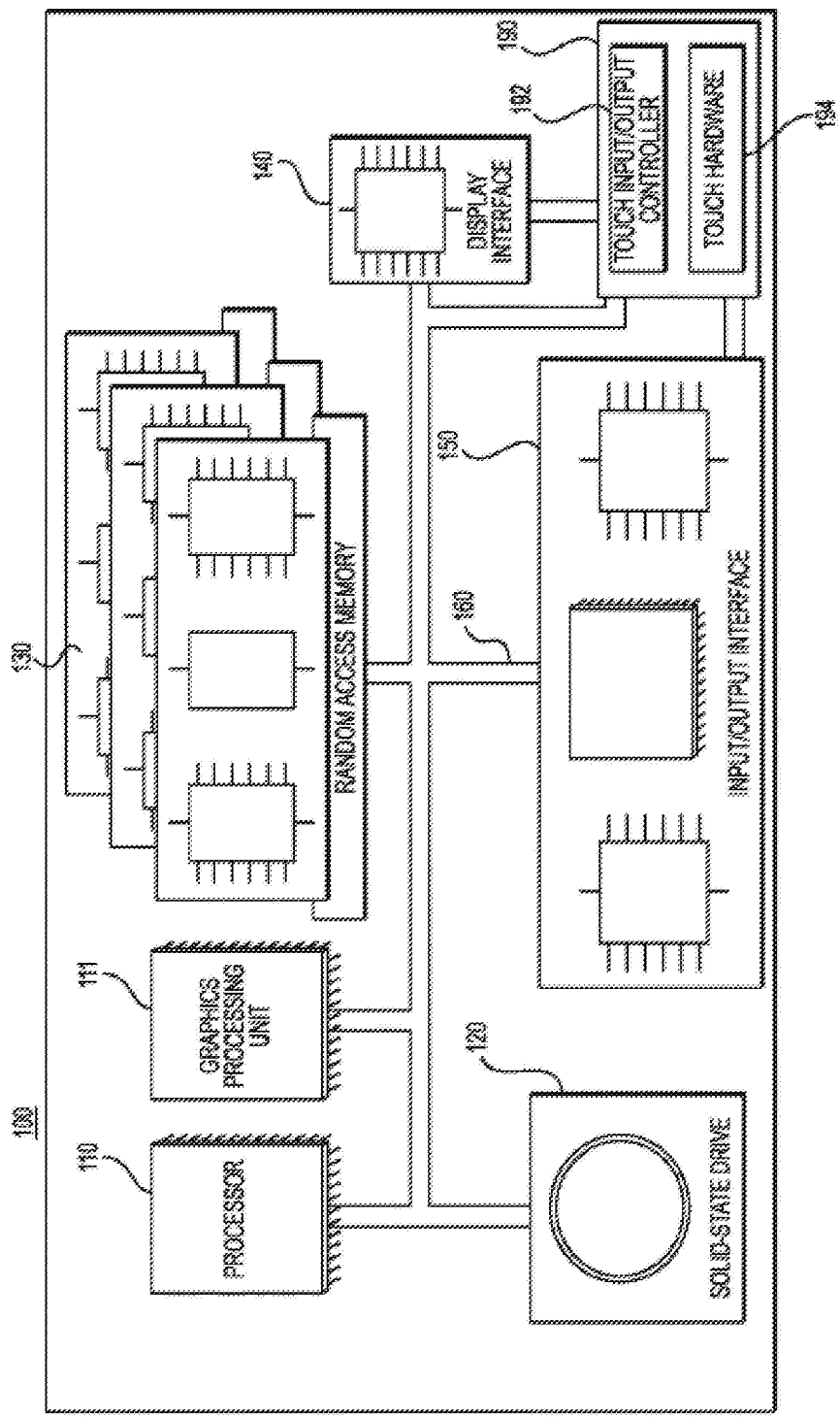
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Now referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for training a machine learning algorithm to perform object classification using byte representations thereof. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

System

Figure 2:
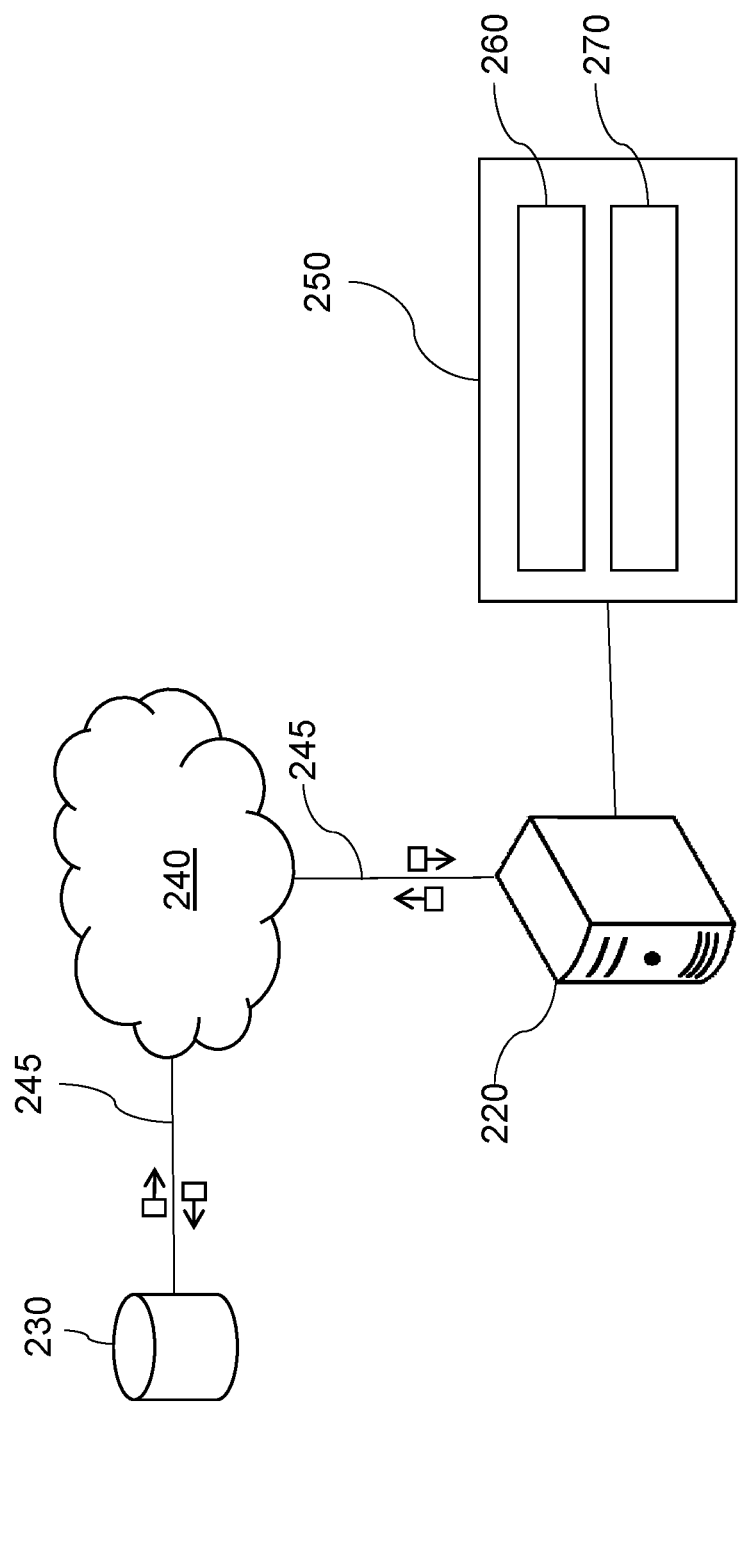
FIG. 2 depicts a schematic diagram of a system in accordance with one or more non-limiting embodiments of the present technology.

Now referring to FIG. 2, there is shown a schematic diagram of a system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a server 220, and a database 230, communicatively coupled over a communications network 240 via respective communication links 245.

Training Server

The server 220 is configured to: (i) receive an indication of one or more objects; (ii) receive a byte representation of the one or more objects in the form of a byte sequence; (iii) generate, based on the byte sequence, a respective set of embedding indices representing the one or more objects; (iv) access one or more MLAs 250; and (v) train the one or more MLAs 250 on a set of reference objects to perform object classification.

How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a server running an operating system (OS). Needless to say that the server 220 may be implemented in any suitable hardware and/or software and/or firmware or a combination thereof. In the disclosed non-limiting embodiment of present technology, the server 220 is a single server. In one or more alternative non-limiting embodiments of the present technology, the functionality of the server 220 may be distributed and may be implemented via multiple servers (not shown).

The implementation of the server 220 is well known to the person skilled in the art. However, the server 220 comprises a communication interface (not shown) configured to communicate with various entities (such as the database 230, for example and other devices potentially coupled to the communication network 240) via the network. The server 220 further comprises at least one computer processor (e.g., the processor 110 of the electronic device 100) operationally connected with the communication interface and structured and configured to execute various processes to be described herein.

Machine Learning Algorithm (MLA)

The server 220 has access to one or more machine learning algorithms (MLAs), which will be referred to as the MLA 250.

The MLA 250 is configured to inter alia: (i) receive a set of indices associated with an object having been generated based on a byte representation of the object; (ii) embed the set of indices to obtain an input vector; and (iii) generate an estimated class for the object based on the input vector.

To achieve that objective, the MLA 250 undergoes a training procedure, which will be explained in more detail herein below.

In one or more embodiments, the training of the MLA 250 is performed using stochastic gradient descent and back propagation. In one or more embodiments, the training is performed using at least one of a negative log-likelihood function, and a hinge loss function.

The MLA 250 has an embedding layer for performing the embedding of the set of indices, and a classification layer for performing class predictions. In one or more embodiments, the embedding layer includes an embedding matrix, and the classification layer includes a classification matrix.

In one or more embodiments, the server 220 uses universum sampling to train the MLA 250.

In one or more embodiments, the MLA 250 is implemented as a linear classifier. In one or more alternative embodiments, the MLA 250 may be implemented as any vector-valued differentiable function. As a non-limiting example, the MLA 250 may be implemented as a multi-layer fed-forward neural network.

In one or more embodiments, the server 220 may execute the MLA 250. In one or more alternative embodiments, the MLA 250 may be executed by another server (not depicted), and the server 220 may access the MLA 250 for training or for use by connecting to the server (not shown) via an API (not depicted), and specify parameters the MLA 250, transmit data to and/or receive data from the MLA 250, without directly executing the MLA 250.

As a non-limiting example, one or more MLAs of the set of MLAs 250 may be hosted on a cloud service providing a machine learning API.

Database

A database 230 is communicatively coupled to the server 220 via the communications network 240 but, in one or more alternative implementations, the database 230 may be communicatively coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the server 220. The database 230 may receive data from the server 220 for storage thereof and may provide stored data to the server 220 for use thereof.

In one or more embodiments of the present technology, the database 230 is configured to inter alia: (i) store an indication of one or more objects; (ii) store byte representations of objects; (iii) store embedding indices generated from byte representations; and (iv) store parameters of one or more MLAs.

Communication Network

In one or more embodiments of the present technology, the communications network 240 is the Internet. In one or more alternative non-limiting embodiments, the communication network 240 may be implemented as any suitable local area network (LAN), wide area network (WAN), a private communication network or the like. It will be appreciated that implementations for the communication network 240 are for illustration purposes only. How a communication link 245 (not separately numbered) between the server 220, the database 230, and/or another electronic device (not shown) and the communications network 240 is implemented will depend inter alia on how each electronic device is implemented.

Embedding Index Generation Procedure

Figure 3:
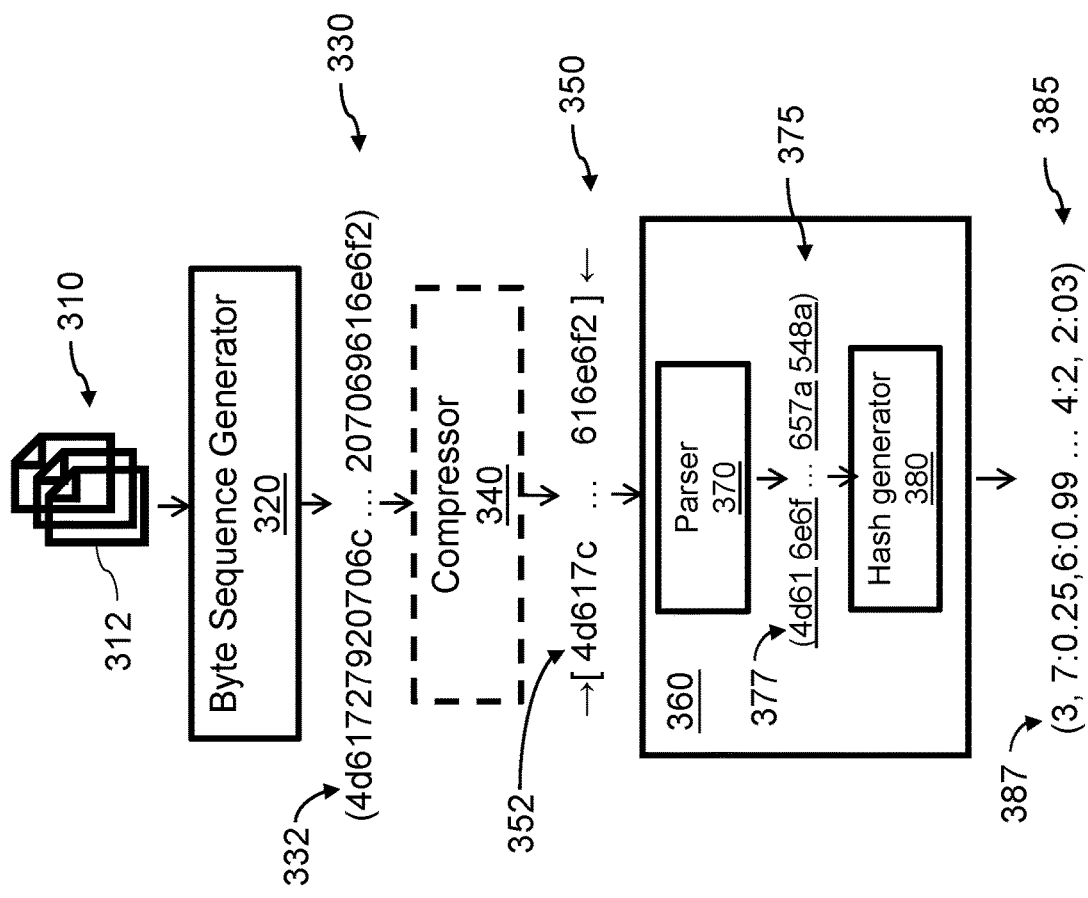
FIG. 3 depicts a schematic diagram of a embedding index generation procedure in accordance with one or more non-limiting embodiments of the present technology.

With reference to FIG. 3 there is shown a schematic diagram of an embedding index generation procedure 300 in accordance with one or more non-limiting embodiments of the present technology.

The embedding index generation procedure 300 comprises inter alia a byte sequence generator 320, an optional compressor 340 and an embedding index generator 360.

The embedding index generation procedure 300 is configured to: (i) receive an indication of one or more objects; and (ii) generate, for each of the one or more objects, respective embedding indices.

The embedding index generation procedure 300 is executed by the server 220. It will be appreciated that the embedding index generation procedure 300 may be executed by another electronic device comprising a processor. In one or more other embodiments, the embedding index generation procedure 300 is executed in a distributed manner.

In one or more embodiments, the embedding index generation procedure 300 may be part of the MLA 250, i.e. the MLA 250 receives as an input what is output by the embedding index generation procedure 300.

Byte Sequence Generator

The byte sequence generator 320 receives as an input an indication of a set of objects 310.

In one or more embodiments, the byte sequence generator 320 obtains the indication of the set of objects 310 from the database 230.

The indication of the set of objects 310 will be used to generate one or more byte representations of each object in the set of objects, which will be provided as an input to the MLA 250.

The set of objects 310 includes one or more objects. It should be understood that the nature of the set of objects 310 is not limited, and may be any type of digital representation of information that may be classified without departing from the scope of the present technology.

In one or more embodiments, the set of objects 310 may be in the form of a text including one or more sentences, words, characters, numbers, and the like.

In one or more other embodiments, the set of objects 310 are genomes represented as characters via nucleobases (e.g. A, C, G, T).

In one or more alternative embodiments, the set of objects 310 may include images.

In one or more embodiments, as a non-limiting example when training the MLA 250, the byte sequence generator 320 acquires the set of objects 310 as well as labels associated with each of the set of objects 310. Each label associated with an object is indicative of a reference class to which the object belongs. The number of classes is not limited, and may include two or more classes.

It will be appreciated that the set of objects 310 and the set of labels may be acquired together, or may be acquired separately and associated by the byte sequence generator 320.

The byte sequence generator 320 uses the indication of the set of objects 310 to obtain, for each respective object 312, a byte representation of the object in the form of one or more respective sequence of bytes or byte sequence 332.

In one or more embodiments, the indication of the set of objects 310 comprises the set of byte sequences 330.

The byte sequence generator 320 outputs the set of byte sequences 330.

Compressor

In one or more embodiments, the compressor 340 is used to compress the byte representation to obtain a compressed byte representation. In one or more other embodiments, the compressor 340 may be optional.

The compressor 340 is configured to: (i) receive as an input a respective byte sequence 332; and (ii) compress the respective byte sequence 332 to output a respective compressed byte sequence 352.

The purpose of compression is to encode each respective byte sequence 332 to obtain a respective compressed byte sequence 352 by using fewer bits than the original byte sequence 332.

The respective compressed byte sequence 352 has a size that is below the original size of the respective byte sequence 332 but that preserves the information contained in the byte sequence 332. It will be appreciated that in some instances the size of the compressed byte sequence may be equal to the size of the uncompressed byte sequence.

Compression of byte sequences before generating the set of embedding indices is optional, but it has been found to achieve unexpected results in the context of the present technology. The compressor 340 compresses the respective byte sequence so as to reduce its size and to improve speed and performance when training the MLA 250.

As a non-limiting example, the compressor 340 may use a compression algorithm such as Huffman encoding (D. A. Huffman, "A Method for the Construction of Minimum-Redundancy Codes," in Proceedings of the IRE, vol. 40, no. 9, pp. 1098-1101, September 1952, doi: 10.1109/JR-PROC.1952.273898).

As a non-limiting example, in some instances, compression may enable decreasing the size of the original byte sequence from two to four times.

The compressor 340 outputs a set of compressed byte sequences 350.

Embedding Index Generator

The embedding index generator 360 is configured to: (i) receive as an input a byte sequence 332 or a compressed byte sequence 352; (ii) parse the respective byte sequence 332 or the respective compressed byte sequence 352 via the parser 370 to obtain a set of byte n-grams 377; and (iii) generate, via the hash generator 380, a set of embedding indices 387 from the set of byte n-grams 377.

The embedding index generator 360 parses each respective byte sequence 332 or respective compressed byte sequence 352 to obtain a respective set of embedding indices 387. The respective set of embedding indices 387 is used an input for training the MLA 250.

The embedding index generator 360 receives, for each reference object, the respective byte sequence. In one or more embodiments where the byte sequences have been compressed, the embedding index generator 360 receives the compressed byte sequences.

In one or more embodiments, where an object 312 is represented by two or more byte sequences, the embedding index generator 360 receives the two or more by sequences for each object 312.

The embedding index generator 360 parses the respective byte sequence 332 or respective compressed byte sequence 352 via the parser 370 by iterating over the byte sequence up to a predetermined length or size to obtain a respective set of byte n-grams or set of byte chunks. It will be appreciated that n-grams may overlap, as a non-limiting examples a nucleotide sequence ATCGAT may result in 3-grams {ATC, TCG, CGA, GAT}.

The predetermined length parameter or size may be determined based on the application and the provided dataset. It will be appreciated that multiple values may be tested and an optimal value may be selected for a dataset of interest. As a non-limiting example, a n-gram configuration where {x, y} indicates that n-grams of length x and y are considered may be used: 1, 2, 4, 8, 16, {1, 2, 3, 4, 5, 6, 7, 8, 9, 10, 11, 12, 13, 14, 15, 16}, {2, 4, 6, 8, 10, 12, 14, 16}, {4, 8, 12, 16}, {8, 16}, {1, 2, 4, 8, 16}, {1, 16}, {1, 4, 16}.

The embedding index generator 360 processes the respective set of byte chunks 377 via the hash generator 380 to obtain the respective set of embedding indices 387, such that each respective set of embedding indices has a fixed size.

The embedding index generator 360 applies a hash function on the respective set of byte chunks 377 via the hash generator 380 to obtain a respective set of embedding indices 387. It will be appreciated that in the context of the present technology, a set of embedding indices may be any representation obtained by iteratively processing a byte representation to obtain an n-gram representation thereof and by processing the n-gram representation to obtain a fixed size representation, as a non-limiting example via a hash function.

The type of hash function used by the hash generator 380 is not limited. In one or more embodiments, the hash function is a non-cryptographic hash function. In one or more alternative embodiments, the hash function is a cryptographic hash function. It will be appreciated that a cryptographic hash function may have an impact on the processing speed and time required to obtain the hash.

As a non-limiting example, the hash function may be a Fowler-Noll-Vo (FNV) hash function, or a CityHash function.

In one or more embodiments, each respective set of embedding indices 387 is associated with a respective set of weights (not shown).

The respective set of weights enables modulating the contribution of each associated embedding index of the set of embedding indices in the final representation, i.e. the weighted sum of the set of embedding indices (or a vector representation thereof), which is received as an input to a linear classifier. It will be appreciated that in instances where no weights are used, the value of the weights may be equal to 1, which results in a sum of the embedding indices (or a sum of the vector representations thereof).

The embedding index generator 360 outputs, for each respective byte sequence 330 or compressed byte sequence 350, the respective set of embedding indices 387.

In one or more embodiments, the embedding index generator 360 outputs, for each respective byte sequence, a respective set of weights associated with the respective set of embedding indices.

The embedding index generator 360 outputs a plurality of sets of embedding indices 385.

Training Procedure

Figure 4:
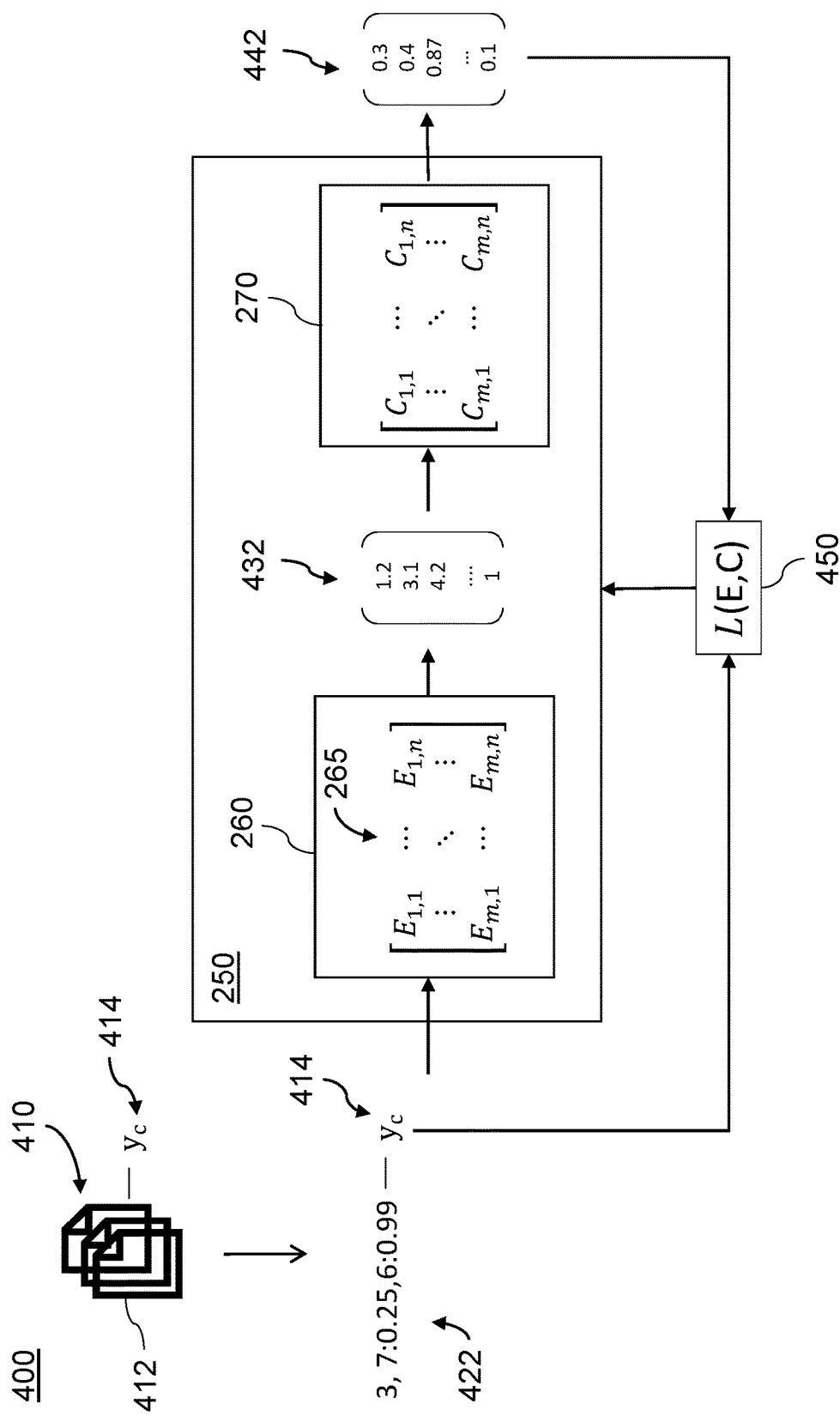
FIG. 4 depicts a schematic diagram of a training procedure in accordance with one or more non-limiting embodiments of the present technology.

FIG. 4 depicts a schematic diagram of a training procedure 400 in accordance with one or more non-limiting embodiments of the present technology.

The training procedure 400 is executed by processor 110 of the server 220. In one or more alternative embodiments, the training procedure 400 may be executed by another electronic device comprising a processor and a non-transitory storage medium.

The training procedure 400 is configured to: (i) initialize parameters of the MLA 250; (ii) receive an indication of a set of reference objects 410; (iii) train the MLA 250 on the set of reference objects 410 to classify objects; and (iv) output the trained MLA 250.

In one or more embodiments, the set of reference objects 410 is received from the database 230. In one or more alternative embodiments, the set of reference objects 410 is received from another electronic device connected to the server 220.

The set of reference objects 410 or set of training objects 410 is a training dataset that is used to fit the parameters of the MLA 250 using supervised learning methods including optimization methods such as gradient descent. Each reference object 412 in the set of reference objects 410 is associated with a respective label or target 414 which is indicative of the reference class the respective reference object 412 belongs to.

The purpose of the training procedure 400 is to train the MLA 250 on the set of reference objects 410 for predicting classes, where the predicted or estimated class is compared with the target class and the parameters of the MLA 250 are adjusted. After completing a training procedure 400, a validation and a testing procedure, the MLA 250 may be used to predict classes of objects the MLA 250 has never "seen", i.e. been trained on.

During the training procedure 400, the MLA 250 learns a model that performs a class prediction on an input vector generated from a set of embedding indices, i.e. the MLA 250 learns a classifier along with an embedding function.

The training procedure 400 receives, based on the indication of the set of reference objects 410, a plurality of set of embedding indices 422 (only one shown in FIG. 4). The training procedure 400 receives the set of embedding indices 422 by executing at least a portion of the embedding index generation procedure 300.

In one or more embodiments, the indication of the set of reference objects 410 is received in the form of a set of byte sequences (not shown) which is provided as an input to the embedding index generator 360 so as to receive the set of embedding indices 422. In one or more alternative embodiments, the set of byte sequences is provided as an input to the compressor 340 and the embedding index generator 360 so as to receive the set of embedding indices 422.

Each reference object 412 in the set of reference objects 410 is represented by the set of embedding indices 422 and is associated with the respective label 414 of the reference object 412.

The MLA 250 has an embedding layer 260, and classification layer 270. In one or more embodiments, the embedding layer 260 includes or executes an embedding matrix 265, and the classification layer 270 includes or executes a classification matrix 275.

The training procedure 400 includes initialization of the model parameters and model hyperparameters of the MLA 250. The model parameters of the MLA 250 are parameters learned during training of the MLA 250, while model hyperparameters may be set by an operator.

The training procedure 400 initializes the model parameters of the MLA 250. The model parameters of the MLA 250 include inter alia a size of the embedding matrix 265, a size of the classification matrix 275, a learning rate, and a number of optimization steps.

The size of the embedding matrix 265 is defined at run-time by an operator. The size of the classification matrix 275 is the same as the number of different labels in the set of reference objects 410. It will be appreciated that there may be two or more labels.

The training procedure 400 includes an initialization of the embedding matrix 265 and the classification matrix 275.

In one or more embodiments, each of the embedding matrix 265 and the classification matrix 275 is initialized by sampling a Gaussian distribution. It will be appreciated that the embedding matrix 265 and the classification matrix 275 may be initialized in other ways without departing from the scope of the present technology.

In one or more embodiments, the training procedure 400 is performed using a variant of stochastic gradient descent with a predetermined learning rate schedule.

The model hyperparameters include inter alia a learning rate, a dropout rate, and a batch size. In one or more embodiments, the model hyperparameters include an initial learning rate, an eventual learning rate, and a number of optimization steps.

In one or more embodiments, assuming a learning rate $\gamma$, and a number of optimization steps t, then the learning rate may be expressed using equation (1):

$$\gamma = \frac{1}{1+\alpha t}a + \frac{\alpha t}{1+\alpha t}b \qquad (1)$$

where a is the initial learning rate and b is the eventual learning rate. In one or more embodiments, $a > b \geq 0$. The initial learning rate $\alpha$ is used to control the speed of learning rate change. In the case that $a>0$ and $b=0$, the learning process is provably convergent with $t \to \infty$. Both the embedding matrix 265 and the classification matrix 275 are updated with the same learning schedule.

The update of the parameters is expressed using equation (2):

$$w_{t+1}=w_t-\pm\nabla_w L-\gamma\lambda w_t \quad (2)$$

Where $\nabla_w L$ is gradient of the loss with respect to the parameters, and $\lambda$ is a weight decay factor.

During an iteration of the training procedure 400, the MLA 250 receives as an input a respective set of embedding indices 422 representing a respective reference object 412.

The MLA 250 generates, via the embedding layer 260, an input vector based on the set of embedding indices 422.

The MLA 250 embeds, via the embedding layer 260, the set of embedding indices 422 to obtain an input vector 432. The size of the input vector 432 is defined at run time.

In one or more embodiments, the MLA 250 performs the embedding of the set of embedding indices 322 by querying the embedding matrix 265 to obtain the input vector 432.

In one or more embodiments, where each respective set of indices is associated with a respective set of weights, each set of indices is weighted by the respective set of weights.

In one or more embodiments, the MLA 250 performs a matrix-vector product between the classification matrix 275 and the input vector 432 to obtain the output vector 442. It will be appreciated that the size of the output vector 442 is equal to the number of classes in the training dataset, i.e. each class present in the set of reference objects 410 corresponds to an element of the output vector 442. The output vector 442 includes a score for each class present in the set of reference objects 410, where the score is indicative of a "probability" of the respective object belonging to each of the reference classes present in the set of reference objects 410.

The MLA 250 predicts an estimated class of the respective set of embedding indices 422 by selecting the class associated with the element having the highest score in the output vector 442, e.g. argmax of the output vector 442. In one or more alternative embodiments, the MLA 250 predicts a class based on a score threshold.

The MLA 250 computes the loss based on the estimated class in the output vector 442 and the label 414. The MLA 250 uses a loss function 450 to calculate the loss.

In one or more embodiments, the loss function is at least one of a negative log-likelihood function, and a hinge loss function. It will be appreciated that other loss functions may be used.

The training procedure 400 calculates gradients of the loss function with regard to the embedding matrix 265 and the classification matrix 275 via backpropagation.

The training procedure 400 uses backpropagation to update at least one parameter or element of at least one the embedding matrix 265 and the classification matrix 275 using the computed gradients. The training procedure 400 updates entries in each of the embedding matrix 265 and the classification matrix 275 that are activated by the respective set of embedding indices 422. The training procedure 400 obtains an updated embedding matrix 265 and an updated classification matrix 275.

The training procedure 400 repeats the training iteratively for each respective set of embedding indices associated with the set of reference objects 410 until convergence.

It is contemplated that the training procedure 400 may be parallelized with multiple threads processing multiple training samples, which is based on developers' assumption that when the size of the embedding is large, the problem is likely sparse and no synchronization of the weight update is necessary. In one or more embodiments, stochastic gradient descent during the training procedure 400 is parallelized using HOGWILD! (Benjamin Recht, Christopher Re, Stephen Wright, and Feng Niu. "HOGWILD!: A lock-free approach to parallelizing stochastic gradient descent." In Advances in neural information processing systems, pp. 693-701, 2011)

In one or more embodiments, when the MLA 250 is parallelized, regularization techniques may be used. As a non-limiting example, universum sampling may be used, where the goal is to generate a set of "fake" samples, and train them with an additional label that represents a "none-of-the-above" class. By default, these "fakes" samples are random byte sequences and embedding indices. For each given sample, N fake samples will be generated and prescribed with the additional "none-of-the-above" label. The learning rate is set as $\rho\gamma$ with $\rho\leq 1/N$ which will ensure that the regularization is probably guaranteed in a probably-approximately-correct-learning (PAC-learning) sense In one or more embodiments, the training procedure 400 comprises a validation procedure and a testing procedure for adjusting parameters of the MLA 250 and evaluating its performance.

The training procedure 400 outputs the MLA 250 as a trained MLA.

The MLA 250 is then output as a trained MLA.

Once trained, the MLA 250 may be used to perform classification of objects by generating a set of embedding indices (as an example by executing the embedding index generation procedure 300).

In one or more embodiments, the MLA 250 may perform text classification.

Method Description

Figure 5:
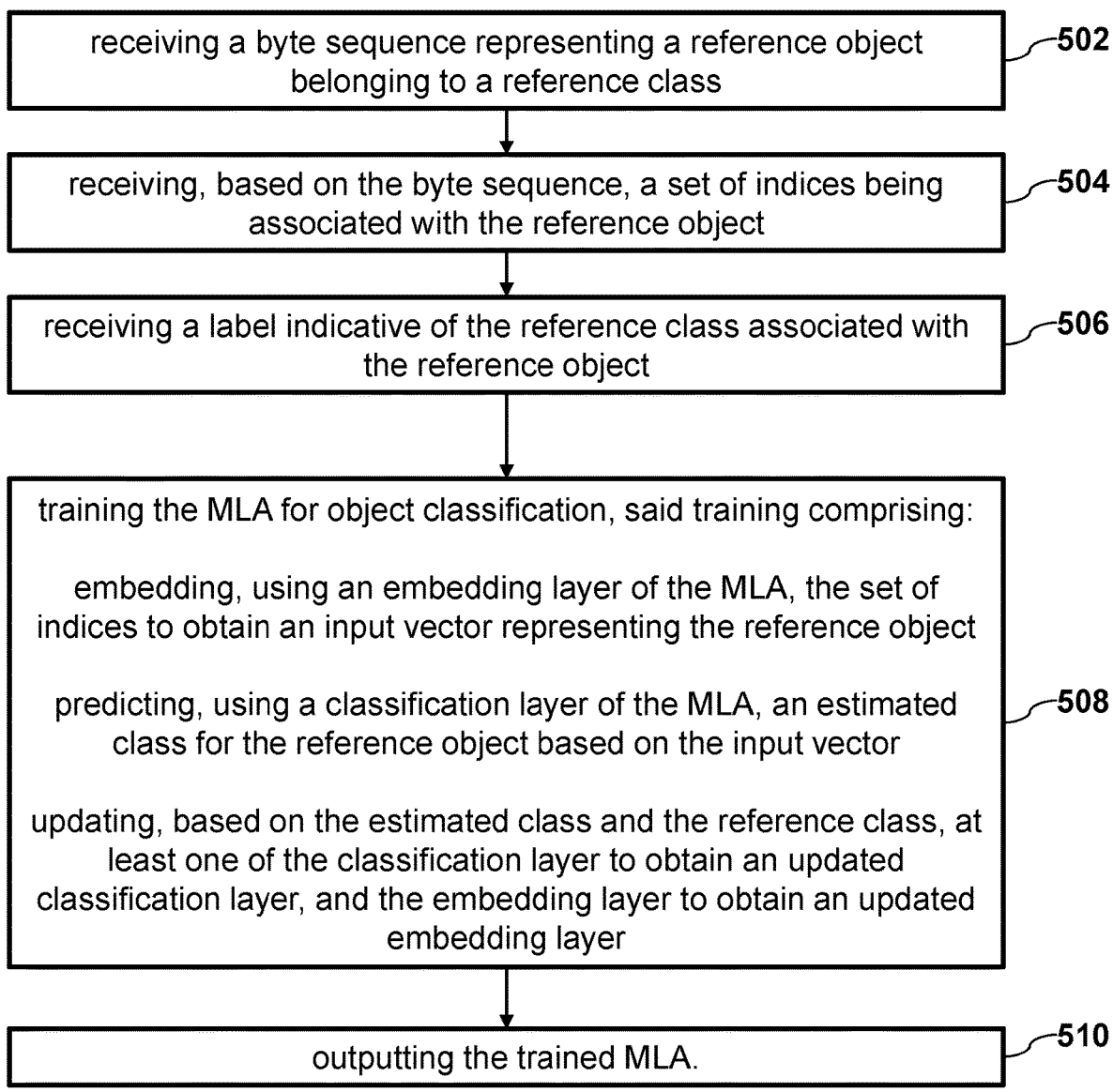
FIG. 5 depicts a flow chart of a method of training a machine learning algorithm for object classification in accordance with one or more non-limiting embodiments of the present technology.

FIG. 5 depicts a flowchart of a method 500 of training the MLA 250 for object classification, the method 500 being executed in accordance with one or more non-limiting embodiments of the present technology.

The server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 500.

The processor 110 of the server 220 has access to the MLA 250.

The method 500 starts at processing step 502.

According to processing step 502, the processor 110 receives a byte sequence representing a reference object 412. The reference object 412 is part of a set of reference objects 410. In one or more embodiments, the byte sequence is received based on the reference object 412.

According to processing step 504, the processor 110 receives a set of embedding indices 422 associated with the reference object 412 belonging to a reference class. In one or more embodiments, the set of embedding indices 422 may be generated by the processor 110 by parsing the byte sequence to obtain a set of byte chunks and by applying a hash function on the set of byte chunks to obtain the set of embedding indices 422. In one or more embodiments, the hash function is a non-cryptographic hash function.

In one or more embodiments, parsing the byte sequence to obtain the set of byte chunks comprises iterating, based on a predetermined length, over the byte sequence to obtain the set of byte chunks.

In one or more alternative embodiments, prior to the parsing, the method compressing the respective byte sequence to obtain a respective compressed byte sequence and parsing the respective byte sequence to obtain the respective set of byte chunks comprises parsing the respective compressed byte sequence to obtain the respective set of byte chunks.

According to processing step 506, the processor 110 receives a label 414 indicative of the reference class associated with the reference object. In one or more embodiments, processing step 504 may be executed concurrently with processing step 502.

It will be appreciated that processing steps 502 to 506 may be repeated to obtain a set of reference objects 410 or training dataset for training the MLA 250.

According to processing step 508, the processor 110 trains the MLA 250 for object classification, where the training includes: initializing the embedding layer 260 and the classification layer 270 of the MLA 250 by sampling a distribution. In one or more embodiments, the embedding layer 260 executes an embedding matrix 265 and the classification layer 270 executes a classification matrix 275.

The training includes: embedding, using an embedding layer 260 of the MLA 250, the set of embedding indices 422 to obtain an input vector 432 representing the reference object 412.

In one or more embodiments, the set of embedding indices 422 includes a first subset of indices and a second subset of indices, and embedding, using the embedding layer 260 of the MLA 250, the set of embedding indices 422 to obtain the input vector 432 representing the reference object comprises: embedding the first subset of indices to obtain a first vector and embedding the second subset of indices to obtain a second vector and combining the first vector and the second vector to obtain the input vector 432.

In one or more embodiments, a first set of weights associated with the first subset of indices is received, and a second set of weights associated with the second subset of indices is received. In one or more embodiments, combining the first vector and the second vector to obtain the input vector 432 includes: weighting the first vector by the first set of weights to obtain a first weighted vector, weighting the second vector by the second set of weights to obtain a second weighted vector, and combining the first weighted vector and the second weighted vector to obtain the input vector 432

The training includes: predicting, using a classification layer 270 of the MLA 250, an output vector 442 including an estimated class for the reference object 412 based on the input vector 432. The training includes updating, based on the estimated class and the reference class of the label 414, at least one of: the classification layer 270 to obtain an updated classification layer 270, and the embedding layer 260 to obtain an updated embedding layer 260. It will be appreciated that entries in each of the embedding matrix 265 and the classification matrix 275 that are activated by the respective set of embedding indices 422 are updated.

In one or more embodiments, said updating, based on the estimated class and the reference class, the at least one of the classification layer 270 to obtain the updated classification layer 270 and the embedding layer 270 to obtain the updated embedding layer comprises 270 updating at least one parameter of the embedding matrix 265 to obtain an updated embedding matrix 265, and updating at least one parameter of the classification matrix 275 to obtain an updated classification matrix, respectively.

In one or more embodiments, the training is performed using stochastic gradient descent and back-propagation. In one or more embodiments, the training is performed using universum sampling.

Processing step 508 is repeated iteratively for each of the set of reference objects 410 until convergence.

According to processing step 510, the processor 110 outputs the trained MLA 250.

Figure 6:
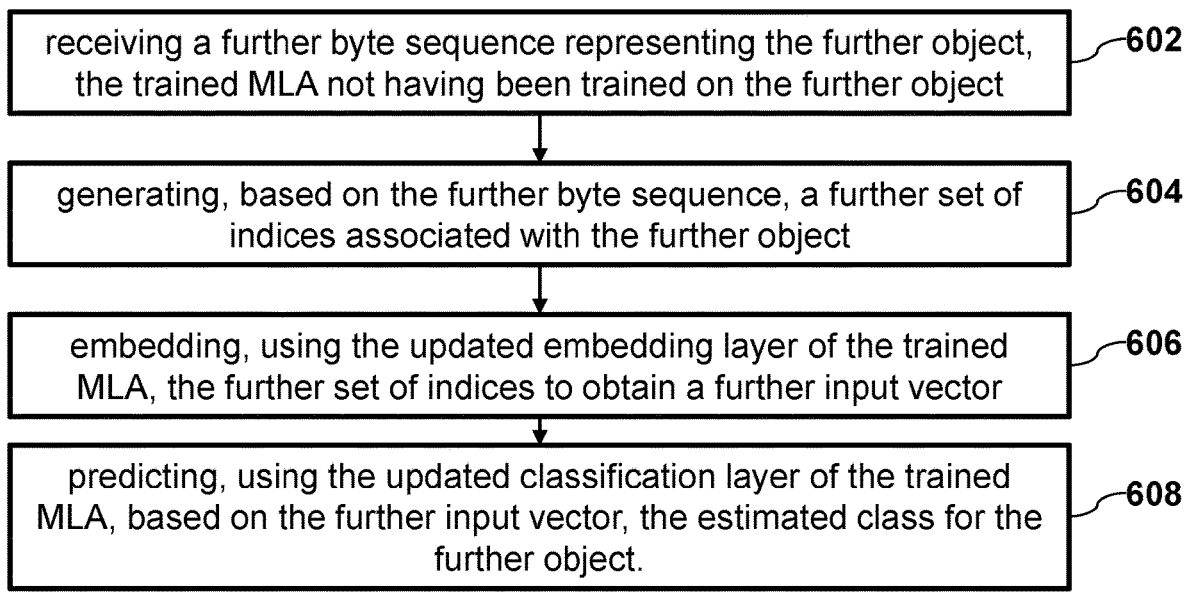
FIG. 6 depicts a flow chart of a method of performing object classification using a trained machine learning algorithm in accordance with one or more non-limiting embodiments of the present technology.

FIG. 6 depicts a flowchart of a method 600 for performing object classification using the trained MLA 250, the method 600 being executed in accordance with one or more non-limiting embodiments of the present technology.

The method 600 is executed after the method 500, i.e. once the MLA 250 has been trained.

The server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 600.

The server 220 has access to the MLA 250.

The method 600 starts at processing step 602.

According to processing step 602, the processor 110 receives a further byte sequence representing a further object, the trained MLA 250 not having been trained on the further object.

According to processing step 604, the processor 110 generates, based on the further byte sequence, a further set of embedding indices associated with the further object.

According to processing step 606, the processor 110 accesses the trained MLA 250 and performs embedding, using the updated embedding layer 260 of the trained MLA 250, the further set of indices to obtain a further input vector.

According to processing step 608, the processor 110 predicts, using the updated classification layer of the trained MLA 250, based on the further input vector, the estimated class for the further object.

It will be appreciated that one or more embodiments of the present technology aim to expand a range of technical solutions for addressing a particular technical problem, namely improving performance of machine learning models for performing classification by processing byte representations to obtain byte n-grams and generating embeddings thereof, which enables saving computational resources such as storage space and processing time.

In one or more embodiments, when applied to genome sequences, the byte-level n-grams of the present technology are akin to the k-mers (i.e., short sequences of k nucleotides) used in reference-free genome comparisons. It has recently been shown that k-mer-based representations were adequate for genotype-to-phenotype prediction of discrete (e.g., resistant vs. susceptible to a drug) and continuous (e.g., dose prediction for treatment) phenotypes. The present technology may enable improving some techniques for predicting discrete phenotypes as it enables processing long strings of bytes (genomes here) with high throughput, which can be useful for time-sensitive genome tagging (e.g., bedside diagnostics). Further, byte level n-grams of the present technology are associated with learned embeddings which can account for the semantic of short strings of DNA nucleotides (e.g., whether or not some sequences participate in the same biological mechanism), while some current approaches only account for the number of occurrences of k-mers. As a non-limiting example, the present technology may be used for prediction of antimicrobial resistance, an important public health issue with a global impact. The genome sequences and labels used to train the classifiers may be extracted from the PATRIC database using the PATRIC Tools package. The textual representation of antimicrobial molecules may be extracted from the PubChem database.

In one or more other embodiments, the present technology may be used for image pre-classification. As a non-limiting example, the present technology may be used to decide whether it is necessary to feed an image to a convolutional networks, i.e. if the present technology can classify an image with relative high confidence, then this image does not need to be fed to a convolutional network, which in some instances takes much longer to process images. It is contemplated that this may be useful for image classification tasks in embedded systems. As a non-limiting example, in the context of the present technology, an image file may be represented as a sequence of bytes (e.g., in JPEG or PNG) and classification may be performed by processing the sequence of bytes. As another non-limiting example, 2D patches of images may be used in place of byte-level n-grams for classification.

In one or more alternative embodiments, the present technology may be used in anomaly detection in the context of cybersecurity, where the problem is to try to predict whether a log entry looks normal, given a certain window of historical log entries. The present technology may be applied by formulating the problem as a pairwise embedding problem that produces a score given the embedding of the historical log entries and the embedding of the current log entry. In practice, this problem requires the present model to be able to learn in a mostly unsupervised fashion due to the scarcity of malicious labels. The present technology may be formulated as a one-class prediction problem, and the universum sample generation process may be used to provide negative samples that corresponds to illegal entries. As a non-limiting example, random byte sequences may be used as universum log entries, and when it is possible to provide labels in a programmed fashion, such as via simulated attacks, these can be formulated as universum sample plugins to improve over the random byte sequences. The present technology may provide both a baseline approach for unsupervised anomaly detection, and the possibility of a systematic integration of anomaly simulation processes.

In one or more further embodiments, the present technology may be used for learning semantic benchmarks for machine translation. Developers of the present technology have appreciated that the Bilingual Evaluation Understudy (BLEU) score is one of the most popular benchmark for machine translation. However, experts have appreciated that BLEU suffers from the following drawbacks: (i) it doesn't consider meaning (semantics); (ii) it doesn't directly consider sentence structure; (iii) it doesn't handle morphologically rich languages well; and (iv) it doesn't map well to human judgements. Developers of the present technology have initial evidence that the model of the present technology trained on a paraphrasing dataset could help to alleviate problems (i)-(iii). The model of the present technology uses embeddings, and it has been shown that embeddings trained on variously different ways to map the meaning of units of texts (mostly words or word n-grams) perform well via the similarity task. The present model may enable mapping longer sentence structure by using longer byte-level n-grams. Further, the model of the present technology operates at the level of bytes, which is applicable to any language.

It will be appreciated that not all technical effects mentioned herein need to be enjoyed in each and every embodiment of the present technology. For example, one or more embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

The invention claimed is:

1. A method for training a machine learning algorithm (MLA) for object classification, the method being executed by a processor, the processor having access to the MLA, the method comprising:
receiving a set of embedding indices being associated with a reference object belonging to a reference class, the set of embedding indices having been generated by using a hash function on a byte sequence representing the reference object;
receiving a label indicative of the reference class associated with the reference object;
training the MLA for object classification, said training comprising:
embedding, using an embedding layer of the MLA, the set of embedding indices to obtain an input vector representing the reference object;
predicting, using a classification layer of the MLA, an estimated class for the reference object based on the input vector;
updating, based on the estimated class and the reference class, at least one of:
the classification layer to obtain an updated classification layer, and
the embedding layer to obtain an updated embedding layer; and outputting the trained MLA.

2. The method of claim 1, further comprising prior to said receiving the set of embedding indices:
receiving a byte sequence representing the reference object associated with the set of embedding indices; and
generating, based on the byte sequence, the set of embedding indices.

3. The method of claim 2, wherein said generating the set of embedding indices comprises:
parsing the byte sequence to obtain a set of byte chunks; and
applying a hash function on the set of byte chunks to obtain the set of embedding indices.

4. The method of claim 3, wherein said parsing the byte sequence to obtain the set of byte chunks comprises iterating, based on a predetermined length, over the byte sequence to obtain the set of byte chunks.

5. The method of claim 3, further comprising, prior to said parsing the byte sequence to obtain the set of byte chunks compressing the byte sequence to obtain a compressed byte sequence, wherein said parsing the byte sequence to obtain the set of byte chunks comprises parsing the compressed byte sequence to obtain the set of byte chunks.

6. The method of claim 1, wherein:
the set of embedding indices comprises a first subset of embedding indices and a second subset of embedding indices; and
said embedding, using the embedding layer of the MLA, the set of embedding indices to obtain the input vector representing the reference object comprises:
embedding the first subset of embedding indices to obtain a first vector and embedding the second subset of embedding indices to obtain a second vector; and
combining the first vector and the second vector to obtain the input vector.

7. The method of claim 6, wherein said receiving the subset of embedding indices comprising the first subset of embedding indices and the second subset of embedding indices comprises:
receiving a first set of weights associated with the first subset of indices, and receiving a second set of weights associated with the second subset of indices; and wherein
said combining the first vector and the second vector to obtain the input vector comprises:
weighting the first vector by the first set of weights to obtain a first weighted vector,
weighting the second vector by the second set of weights to obtain a second weighted vector, and
combining the first weighted vector and the second weighted vector to obtain the input vector.

8. The method of claim 1, wherein:
the embedding layer executes an embedding matrix;
the classification layer executes a classification matrix; and
said updating, based on the estimated class and the reference class, the at least one of the classification layer to obtain the updated classification layer and the embedding layer to obtain the updated embedding layer comprises:
updating at least one parameter of the embedding matrix to obtain an updated embedding matrix, and updating at least one parameter of the classification matrix to obtain an updated classification matrix, respectively.

9. The method of claim 1, wherein said training the MLA for object classification is performed using stochastic gradient descent and back-propagation.

10. The method of claim 1, wherein said training the MLA for object classification comprises performing universum sampling.

11. The method of claim 1, wherein the reference object comprises one of: at least a portion of a genome, at least one character, and at least a portion of an image.

12. The method of claim 1, further comprising, prior to said outputting the trained MLA:
receiving a plurality of sets of embedding indices, each one of the plurality of sets of embedding indices being associated with a respective reference object belonging to a respective reference class;
receiving, for each respective reference object, a respective label indicative of the respective reference class associated with the respective reference object; and
training the MLA iteratively on each one of the plurality of sets of embedding indices and the respective label.

13. A method for predicting an estimated class for a further object using the trained MLA of claim 1, the method comprising:
receiving a further byte sequence representing the further object, the trained MLA not having been trained on the further object;
generating, based on the further byte sequence, a further set of embedding indices associated with the further object;
embedding, using the updated embedding layer of the trained MLA, the further set of embedding indices to obtain a further input vector; and
predicting, using the updated classification layer of the trained MLA, based on the further input vector, the estimated class for the further object.

14. A method for predicting an estimated class of an object, the method being executed by a processor, the processor having access to a machine learning algorithm (MLA) having been trained to classify objects, the MLA comprising an embedding layer and a classification layer, the method comprising:
receiving a byte sequence representation of the object;
generating, based on the byte representation, using a hash function, a set of embedding indices associated with the object;
embedding, using the embedding layer of the MLA, the set of embedding indices to obtain an input vector representing the object;
predicting, using a classification layer of the MLA, the estimated class for the object based on the input vector; and
outputting the estimated class.

15. A system for training a machine learning algorithm (MLA) for object classification, the system comprising:
a processor; and
a non-transitory storage medium operatively connected to the processor, the non-transitory storage medium comprising computer readable instructions;
the processor having access to the MLA, the processor, upon executing the computer readable instructions, being configured for:
receiving a set of embedding indices being associated with a reference object belonging to a reference class the set of embedding indices having been generated by using a hash function on a byte sequence representing the reference object;
receiving a label indicative of the reference class associated with the reference object;
training the MLA for object classification, said training comprising:
embedding, using an embedding layer of the MLA, the set of embedding indices to obtain an input vector representing the reference object;
predicting, using a classification layer of the MLA, an estimated class for the reference object based on the input vector;
updating, based on the estimated class and the reference class, at least one of:
the classification layer to obtain an updated classification layer, and
the embedding layer to obtain an updated embedding layer; and
outputting the trained MLA.

16. The system of claim 15, wherein the processor is further configured for, prior to said receiving the set of embedding indices:
receiving a byte sequence representing the reference object associated with the set of embedding indices; and generating, based on the byte sequence, the set of embedding indices.

17. The system of claim 16, wherein said generating the set of embedding indices comprises:
parsing the byte sequence to obtain a set of byte chunks; and
applying a hash function on the set of byte chunks to obtain the set of embedding indices.

18. The system of claim 17,
wherein the processor is further configured for, prior to said parsing the byte sequence to obtain the set of byte chunks:
compressing the byte sequence to obtain a compressed byte sequence; and wherein
said parsing the byte sequence to obtain the set of byte chunks comprises parsing the compressed byte sequence to obtain the set of byte chunks.

19. The system of claim 15, wherein the processor is further configured for, prior to said outputting the trained MLA:
receiving a plurality of sets of embedding indices, each one of the plurality of sets of embedding indices being associated with a respective reference object belonging to a respective reference class;
receiving, for each respective reference object, a respective label indicative of the respective reference class associated with the respective reference object; and
training the MLA iteratively on each one of the plurality of sets of embedding indices and the respective label.

20. A system for predicting an estimated class for a further object using the trained MLA of claim 15, the processor being configured for:
receiving a further byte sequence representing the further object, the trained MLA not having been trained on the further object;
generating, based on the further byte sequence, a further set of embedding indices associated with the further object;
embedding, using the updated embedding layer of the trained MLA, the further set of embedding indices to obtain a further input vector; and
predicting, using the updated classification layer of the trained MLA, based on the further input vector, the estimated class for the further object.

* * * * *